(12) United States Patent
Aqlan et al.

(10) Patent No.: US 10,395,323 B2
(45) Date of Patent: Aug. 27, 2019

(54) DEFECT MANAGEMENT (71) Applicant: INTERNATIONAL BUSINESS MACHINES CORPORATION, Armonk, NY (US)

(72) Inventors: Faisal Aqlan, Erie, PA (US); Juan F. Garzon, Staatsburgh, NY (US); Alex R. Jorge-Ortiz, Wallkill, NY (US); Sreekanth Ramakrishnan, Salem, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 14/934,905

(22) Filed: Nov. 6, 2015

(65) Prior Publication Data

US 2017/0132724 A1    May 11, 2017

(51) Int. Cl.
*G06Q 50/04* (2012.01)
*G06Q 10/06* (2012.01)

(52) U.S. Cl.
CPC ..... *G06Q 50/04* (2013.01); *G06Q 10/063112* (2013.01); *G06Q 10/063118* (2013.01); *Y02P 90/30* (2015.11)

(58) Field of Classification Search
None
See application file for complete search history.

(56) References Cited

U.S. PATENT DOCUMENTS

| 5,463,768 | A  | * | 10/1995 | Cuddihy ............. G06F 11/2205 714/37 |
| 6,466,895 | B1 |   | 10/2002 | Harvey et al. |
| 6,606,480 | B1 | * | 8/2003  | L'Allier .................. G09B 7/02 434/219 |
| 6,954,678 | B1 |   | 10/2005 | Phan et al. |
| 8,260,653 | B1 | * | 9/2012  | Osterfelt ................ G06Q 10/06 705/7.28 |

(Continued)

FOREIGN PATENT DOCUMENTS

JP    2006278547 A    10/2006

OTHER PUBLICATIONS

Ge et al., Capability-based Project Scheduling with Genetic Algorithms, Conference paper published by IEEE, 2006, pp. 1-6.

(Continued)

*Primary Examiner* — Kurtis Gills
*Assistant Examiner* — Akosua Kyereme-Tuah
(74) *Attorney, Agent, or Firm* — Cantor Colburn LLP; Tihon Poltavets (57) ABSTRACT

Technical solutions are described to for assigning a team to resolve a defect during a manufacturing process. The method includes identifying a root cause of a defect from a root cause database by generating a reference code. The method also includes generating a defect score based on characteristics of the defect and the root cause, and identifying a set of solutions for the defect based on the defect score. The method also includes selecting a first solution from the set of solutions to implement and determining a candidate skill for the implementation. The method also includes identifying, from an employee database, a candidate employee that has the candidate skill and assigning the candidate employee to the team to resolve the defect.

2 Claims, 8 Drawing Sheets

(56) References Cited

U.S. PATENT DOCUMENTS

| | | |
|---|---|---|
| 8,326,870 B2 | 12/2012 | Rizzolo et al. |
| 8,594,977 B2 | 11/2013 | Laberge et al. |
| 2002/0069218 A1 | 6/2002 | Sull et al. |
| 2003/0207519 A1* | 11/2003 | Pnueli .................. H01L 22/20 438/200 |
| 2004/0225475 A1* | 11/2004 | Johnson ............ G05B 23/0278 702/185 |
| 2005/0015678 A1 | 1/2005 | Miller |
| 2008/0270331 A1* | 10/2008 | Taylor .................... G06N 3/126 706/13 |
| 2009/0276281 A1 | 11/2009 | Foltz et al. |
| 2012/0216081 A1 | 8/2012 | Duvvoori et al. |
| 2014/0136256 A1 | 5/2014 | Brown |
| 2014/0279718 A1 | 9/2014 | Southey et al. |
| 2015/0025928 A1* | 1/2015 | Kang ............. G06Q 10/063112 705/7.14 |

OTHER PUBLICATIONS

Musulin et al., Integration of Principal Component Analysis and Fuzzy Logic Systems for Comprehensive Process Fault Detection and Diagnosis, 2006, pp. 1739-1750.

Nikos Tsianos et al., Enhancing eLearning Environments with Users' Cognitive Factors: The case of Ekpaideion, The 7th European Conference on e-Learning, pp. 877, Nov. 2008, University of Cyprus, Department of Computer Science.

Viveros et al., Resolving Equipment Failure Causes by Root Cause Analysis and Theory of Inventive Problem Solving, 2014, pp. 93-111.

* cited by examiner

DEFECT MANAGEMENT

BACKGROUND

The present application relates to resolving defects, and more specifically, to identifying a root cause of defect and assigning a team of employees, who are skilled to handle the root cause, to resolve the defect.

If a risk to quality of a product or a service being offered by an organization is not managed effectively, defects can transit through the organization's production and/or supply chain and adversely affect consumers of the product and/or service. Such effects ultimately may harm reputation of the organization offering the defective product and/or service as well as other partners of the organization, since quality issues can affect customer satisfaction and additionally, increase costs of quality. Usually, cost of quality consists of two components: (1) quality risk loss cost, and (2) quality risk management cost. Reactive strategies are related to the quality risk loss cost whereas preventive strategies are related to the quality risk management cost.

SUMMARY

According to an embodiment, a computer implemented method for assigning a team to resolve a defect during a manufacturing process, includes generating, by a processor, a defect reference code in response to occurrence of the defect during the manufacturing process. The computer implemented method also includes determining presence of the reference code in a root cause database. The computer implemented method also includes identifying a root cause of the defect in response to the reference code being present in the root cause database, where an entry in the root cause database matches the defect and the root cause based on the reference code. The computer implemented method also includes generating a defect score for the defect based on characteristics of the defect and characteristics of the root cause. The computer implemented method also includes identifying, from the root cause database, a set of solutions for the defect based on the defect score. The computer implemented method also includes generating a solution score for each solution in the set of solutions. The computer implemented method also includes selecting a first solution from the set of solutions to implement in response to the defect, the first solution selected in response to the first solution being the solution with the highest score among the set of solutions. The computer implemented method also includes determining a candidate skill for implementing the first solution. The computer implemented method also includes identifying, from an employee database, a candidate employee that has the candidate skill to implement the first solution, where the employee database includes an employee record for each candidate employee, and the employee record identifies candidate skills possessed by the corresponding candidate employee. The computer implemented method also includes assigning the candidate employee to the team to resolve the defect according to the first solution.

According to another embodiment, a system for resolving a defect during product development includes a root cause database that includes a plurality of entries. Each root cause entry in the root cause database maps a defect reference code with a root cause. The system also includes an employee database that includes a plurality of entries. Each employee entry in the employee database identifies resources possessed by an employee. The system further includes a processing device. The processing device generates the defect reference code in response to occurrence of the defect. The processing device determines presence of the reference code in the root cause database. The processing device also identifies the root cause of the defect in response to the reference code being present in the root cause database. The processing device also generates a defect score for the defect based on characteristics of the defect. The processor also identifies, from the root cause database, a set of solutions for the defect based on the defect score. The processing device also computes a solution score for each solution in the set of solutions. The processing device also selects a first solution from the set of solutions to implement in response to the defect, the first solution selected in response to the first solution being the solution with the highest score among the set of solutions. The processing device also identifies a resource for implementation of the first solution. The processing device also identifies, from the employee database, the employee that has the resource to implement the first solution. The processing device also assigns the employee to a team to resolve the defect according to the first solution.

According to another embodiment, a computer program product for resolving a defect during product development includes computer readable storage medium. The computer readable storage medium includes computer executable instructions. The computer readable storage medium includes instructions to generate a defect reference code in response to occurrence of the defect. The computer readable storage medium also includes instructions to determine presence of the defect reference code in a root cause database. The computer readable storage medium also includes instructions to identify a root cause of the defect in response to the defect reference code being present in the root cause database. The computer readable storage medium also includes instructions to generate a defect score for the defect based on characteristics of the defect. The computer readable storage medium also includes instructions to identify, from the root cause database, a set of solutions for the defect based on the defect score. The computer readable storage medium also includes instructions to compute a solution score for each solution in the set of solutions. The computer readable storage medium also includes instructions to select a first solution from the set of solutions to implement in response to the defect, the first solution selected in response to the first solution being the solution with the highest score among the set of solutions. The computer readable storage medium also includes instructions to identify a resource for implementation of the first solution. The computer readable storage medium also includes instructions to identify, from an employee database, an employee that has the resource to implement the first solution. The computer readable storage medium also includes instructions to assign the employee to a team to resolve the defect according to the first solution.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for defect management, such as in a product development process, such as a manufacturing environment, a software development cycle, an assembly plant, or any other development process. The technical solutions may also be used in organizations such as pharmaceutical laboratories, chemical laboratories, or any other environment in which in response to a defect, identifying a root cause of the defect and resolving the defect prior to a consumer of the output of the process experiencing the defect or any effects of the defect. An embodiment of the technical solutions described herein, include an automated system, which includes at least three phases, a problem identification and characterization phase, a solution retrieval phase, and a resource-skills matrix generation phase. The problem identification and characterization is based on current and historical data. The solution retrieval is based on historical data where solutions of same or similar problem are retrieved and rated based on factors such as solution effectiveness, ease of implementation, relationship to problem, and so on. One of the possible solutions identified is selected as the best solution based on a score assigned to each identified solution. The resource-skills matrix (RSM) is then developed based on the selected solution. The RSM, in an example, is a two dimensional matrix that identifies the skills and resources to be used to resolve the identified problem(s).

Figure 1:
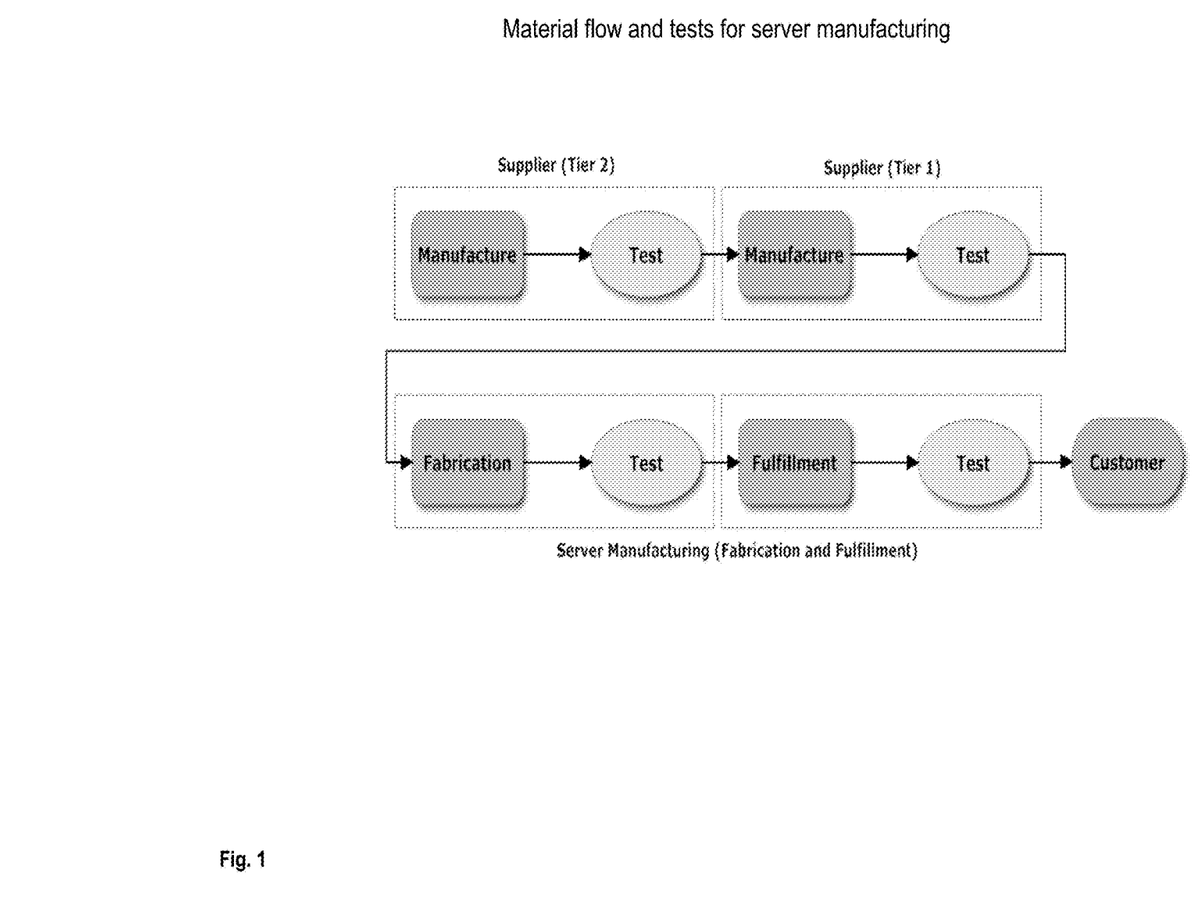
FIG. 1 illustrates an example manufacturing process in accordance with an embodiment.

Although the technical solutions described herein may be used in any process in any environment in which defects can occur, for explanation purposes, a fab-fulfillment process in a server manufacturing environment is considered. Outsourcing of parts and components in server manufacturing, as in other industries, is an important part of supply chain management. Outsourcing provides many potential benefits to the company. However, it can also cause some risks to the organization such as quality risks, material shortage risks, transportation risk, and so on. Quality issues are major disruptions of the operations in the server manufacturing process. Defective parts may be disposed, repaired, or returned to the supplier depending on the issue identified. For example, defective parts or parts suspect are flagged so that they can be removed from the manufacturing process. Flagging and removal of a defective part protects the organization's product, image, and reputation, and ultimately customer satisfaction. Product quality is ensured through test processes, manufacturing, and design. Typically, during the fab-fulfillment process, for quality and reliability of servers being manufactured, tests are performed at various stages. Since server components are expensive and are precision oriented, each part is tested multiple times at the suppliers' sites as well as manufacturers' (or assemblers') sites. Material flow and tests for server manufacturing is shown in FIG. 1. Major quality risk events can disrupt the smooth flow of product and operations in the supply chain. Quality management, which includes defect management, is responsible for stopping the flow of defective material from reaching the customer.

Defect management in such environment is a difficult task because it requires extended hours of troubleshooting sessions from groups of diverse and high skilled individuals in multiple disciplines, which increases a resolution response time for an identified defect. Many factors such as complexity of the configuration of the item being tested, the amount of data being captured for each defect, and frequency of defects, generate large amounts of data, such as 50 gigabytes (GB), 500 GB, 1 terabyte (TB), 1 exabyte (EB), and other such large amounts of data. Accordingly, the technical solutions described herein provide a predictive model to decipher a root cause of the identified defect, and identify engineers, technicians, and other candidate employees, that possess the candidate skills and/or experience to minimize the response time for the defect.

Defect management in manufacturing environments, such as the server manufacturing environment, includes identification of a defect, finding solutions for the defect, and providing resources and tools to repair the defect. Predicting and preventing the defect or quality issues before they can occur is performed during quality risk management. Tools, such as Risk Ranking and Filtering (RRF), Failure Mode and Effect Analysis (FMEA), Hazard and Operability Analysis (HAZOP), and Fault Tree Analysis (FTA) are used for analyzing the defects. However, these systems implementing such tools fail to identify skills and resources of candidate employees to resolve the defect.

Further, such systems rely on error prone manual processes, such as technicians identifying a defect, which cause the defect management to be time consuming (for example, 30 minutes to resolve a defect). Additionally, the manual processes make the systems inconsistent in how defects are handled. Furthermore, occurrences of defects are left unresolved in case a root cause is not known (unstructured data not utilized). The technical solutions described herein manage defects and identify feasible solutions to overcome the defect using attributes of the defect identified, and proactively identifying one or more employees with skills to resolve the defect.

Figure 2:
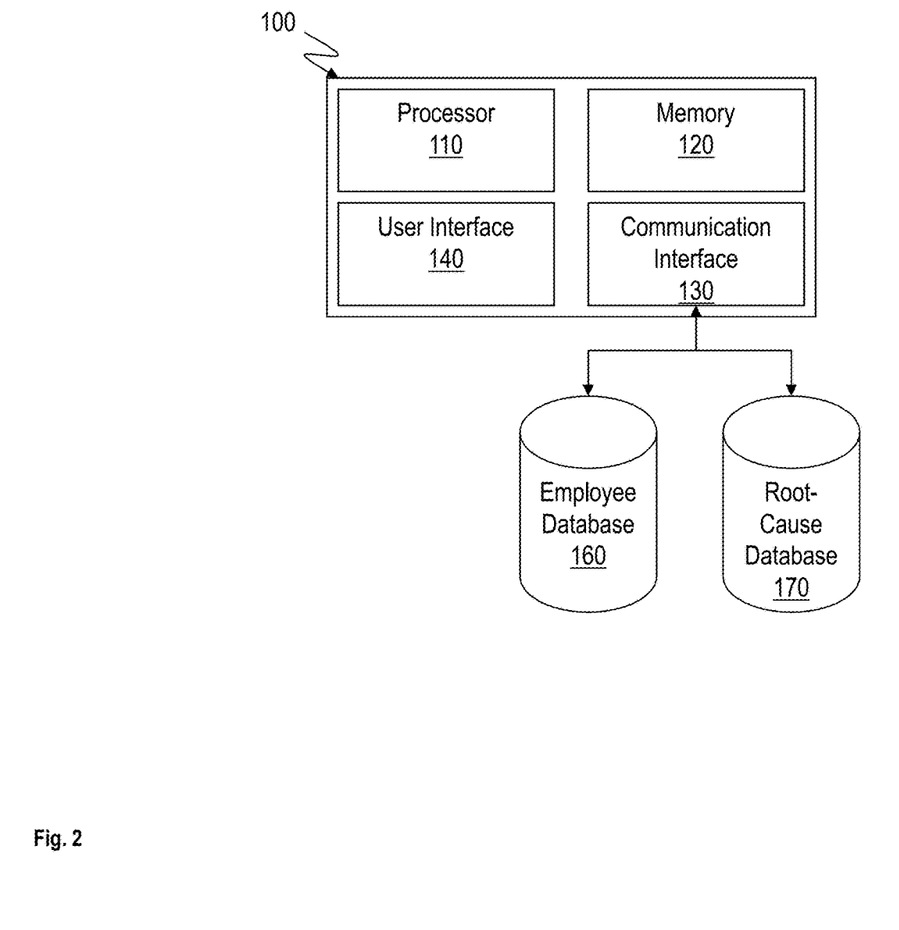
FIG. 2 illustrates an example defect resolution system in accordance with an embodiment.

FIG. 2 illustrates an example defect resolution system 100. The defect resolution system 100 includes, among other components, hardware such as a processor 110, a memory 120, a communication interface 130, and user interface 140. The components of the defect resolution system 100 may communicate with an employee record database 160 and a root cause database 170. In an example, the databases 160 and 170 may be in separate remote locations, such as remote servers. Alternatively, the databases 160 and 170 may be stored in the memory 120.

The processor 110 may be a central processor of the defect resolution system 100, and is responsible for execution of an operating system, control instructions, and applications installed on the defect resolution system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120, the communication interface 130, the user interface 140, and other components of the defect resolution system 100.

The memory 120 is non-transitory computer storage medium. The memory 120 may be DRAM, SRAM, Flash, or any other type of memory or a combination thereof. The memory 120 stores control instructions and applications executable by the processor 110. The memory 120 may contain other data such as images, videos, documents, spreadsheets, audio files, and other data that may be associated with operation of the system 100.

The communication interface 130 facilitates the defect resolution system 100 to receive and transmit data. For example, the communication interface 130 receives alerts from components of a manufacturing process, such as in the form of a computer network communication, indicating occurrence of a defect in the manufacturing process. The computer network communication may be wired or wireless. Alternatively or in addition, the communication interface 130 facilitates communication in other manners, such as via communication ports like Universal Serial Bus™ (USB), Ethernet, Thunderbolt™, or any other communication ports. The communication interface 130 further facilitates the defect resolution system 100 to transmit data, such as to execute the remediation procedures in response to the defect. For example, the communication interface 130 facilitates communication with the user interface 140. The communication interface 130, in another example accesses information about the defect and/or remediation procedures of the defect from the root cause database 170. In addition, the communication interface 130 accesses information from the employee database 160. The communication interface 130 further facilitates storing information in the employee database 160 and/or the root cause database 170. Of course, the communication interface 130 may communicate to access and store data in other data repositories, other than the employee database 160 and the root cause database 170.

The user interface 140 may include input/output peripherals such as keyboard, mouse, touchscreen, microphone, display, speakers, and any other components that facilitate user interaction with the system 100. In an example, a user inputs configuration values, instructions, or other data during the operation and to aid the defect resolution being performed by the system 100. In addition, the system 100 includes components such as computational devices such as graphics processing unit (GPU), arithmetic unit (AU), or any other co-processor (not shown).

Figure 3:
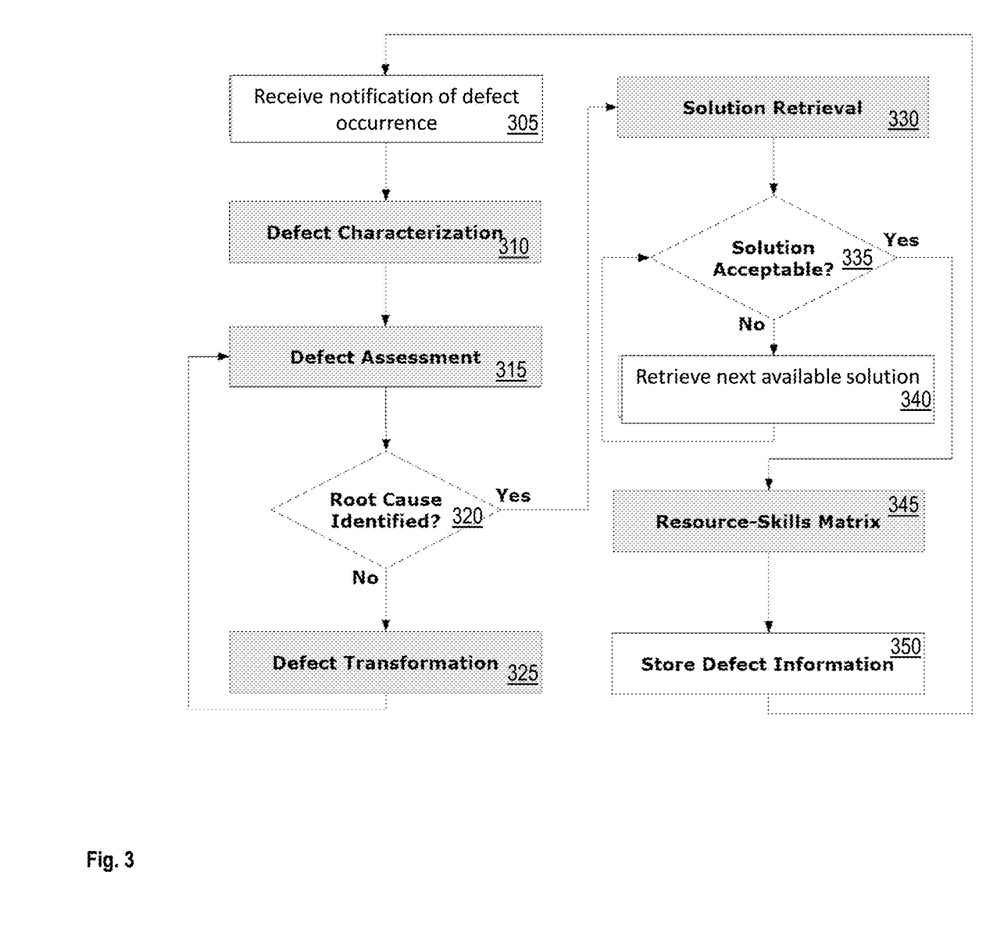
FIG. 3 illustrates a flowchart of operation of a defect resolution system in accordance with an embodiment.

FIG. 3 illustrates a flowchart of an overall operation of the defect resolution system 100. In an example, the operations described herein are embodied in form of computer executable instructions on the memory 120, the instructions executable by the processor 110. Although the operations are described in context of a server manufacturing process, the logic described herein is applicable in any other environment. The processor 110 receives a notification of an occurrence of a defect during the manufacturing process, as shown at block 305. For example, every operation or incident during the manufacturing process is encoded a '0' (zero) in case the incident completes successfully, and is encoded a '1' (one) in case a defect is identified during completion of the incident. Based on a characterization and assessment of the defect that has occurred, the processor 110 associates the defect with a reference code, as shown at blocks 310 and 315. The reference code is an identifier of the defect.

Figure 4A:
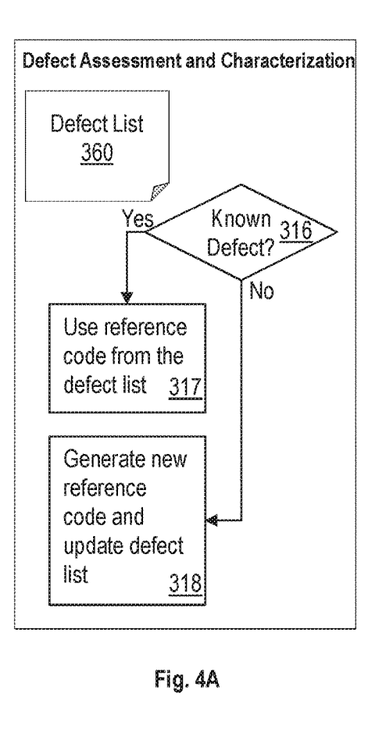
FIG. 4A illustrates a flowchart for defect characterization in accordance with an embodiment.

FIG. 4A illustrates the defect assessment and characterization to assign the current defect a reference code. In an example, the processor 110 selects the reference code from a defect list 360. The defect list 360 may be part of the root cause database 170. The defect list 360 may include a list of defects and characteristics of each defect in the list. For example, the characteristics of a defect include a defect name, a failed component, a name of a vendor/supplier/manufacturer of a component that has the defect, a phase of the manufacturing process at which the defect occurs, or any other such characteristics. Other examples of defect characteristics may include time-to-fail, product criticality (for example storage size in case of server manufacturing), frequency of occurrence, and root cause. The characteristics of the defect may be included in the notification that identifies the occurrence of the defect to the processor 110. The processor 110 matches the characteristics of the current defect with the characteristics of the defects stored in the defect list 360 to identify if the current defect is an instance of one of the defects listed in the defect list 360. If the characteristics of the current defect match with a defect from the defect list 360, the processor 110 assigns the current defect a reference code of the known defect from the defect list 360, as shown at blocks 316 and 317. Else, the processor 110 generates a new reference code for the current defect and further updates the defect list 360 with the description of the current defect and the generated reference code, as shown at blocks 316 and 318. The reference code is an identifier, such as a sequence of digits, an alphanumeric string, or any other form of identification. In an example, the reference code is a hexadecimal number.

Depending upon the reference code, the processor 110 searches a root cause of the defect in the root cause database 170, as shown at block 320. The root cause database 170 includes entries that match a defect and a corresponding root cause based on the reference code. The root causes in the root cause database 170 are identified by technical specialists, such as commodity designers, senior technicians, engineers, and others who monitor the manufacturing process. Thus, the root cause database 170 is a repository that matches a defect with a root cause, and the processor 110 identifies a root cause corresponding to the defect reference code associated with the current defect.

If the root cause exists and is identified in the root cause database, the processor 110 continues to identify one or more solution corresponding to the root cause that is identified, as shown at block 330. The root cause database 170 contains the one or more solutions to a root cause. The solutions corresponding to the root cause may be different from each other based on which technician, or which team of technicians, resolved the root cause at different times. Accordingly, each solution may demand different skill set from employee(s) assigned to implement the solution. For example, if the root cause of a defect is identified as an issue with a conveyor belt, one solution may be to repair the conveyor belt, and another solution may be to replace the conveyor belt. A different team of employees may be assigned to resolve the defect in this case depending on which of the two solutions is selected for implementation.

Figure 5:
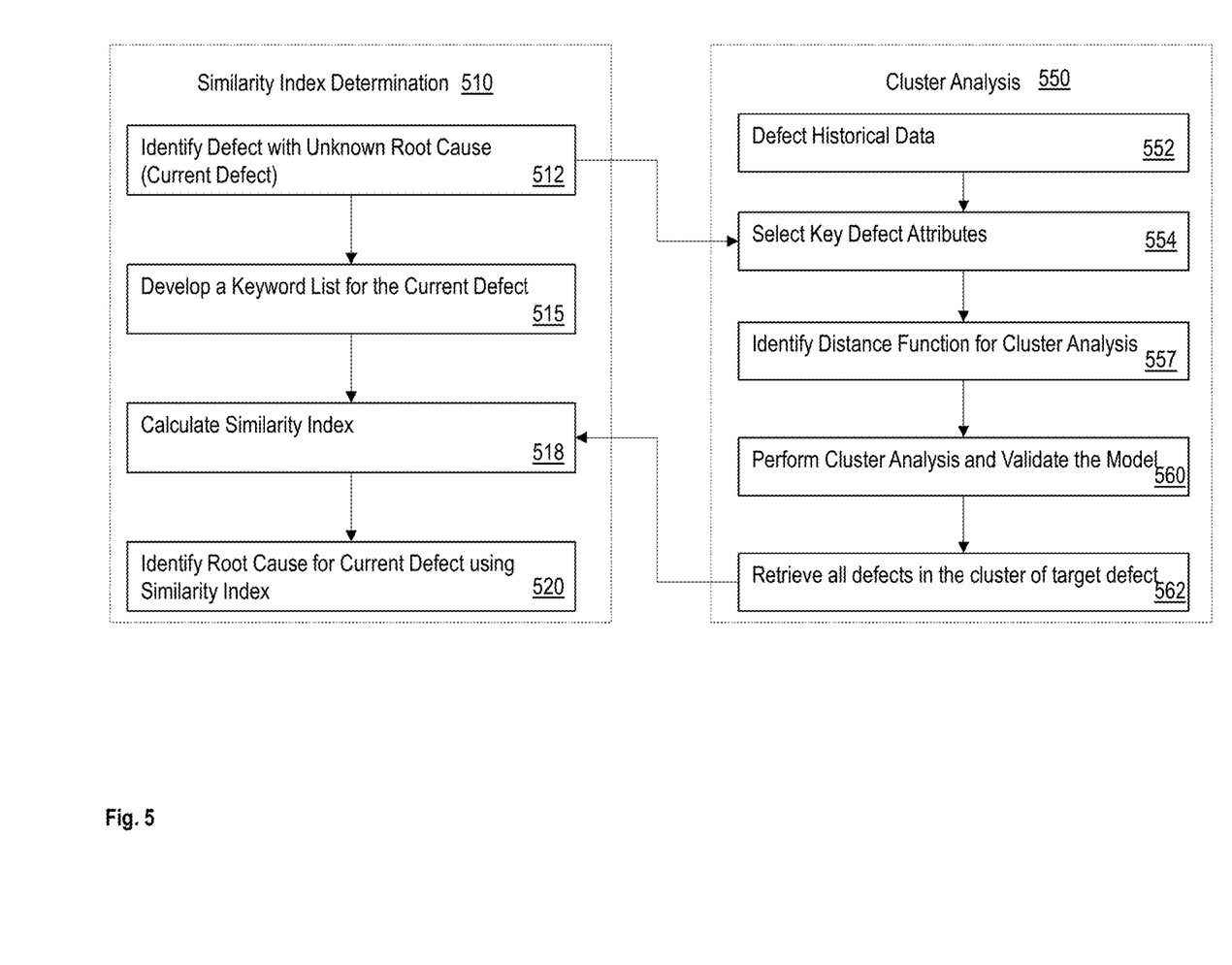
FIG. 5 illustrates a flowchart for defect transformation in accordance with an embodiment.

Referring back to FIG. 3, in case the processor is unable to identify a root case of the current defect, the processor 110 transforms the current defect using a defect transformation, as shown at blocks 320 and 325. FIG. 5 illustrates a flowchart of example defect transformation using a similarity index determination 510. The example defect transformation illustrated in FIG. 5 uses a cluster analysis 550. The processor 110 may determine the similarity index using different techniques in other examples. In the illustrated example, the similarity index determination 510 is initiated in response to identifying the current defect that has an unknown root cause, as shown at block 512. The processor 110 determines a keyword list for the current defect, as shown at block 515. The keyword list may identify the defect characteristics, such as a time-to-fail, a product criticality (for example storage size in case of server manufacturing), a frequency of occurrence, a defect name, a failed component, a name of a vendor/supplier/manufacturer of a component that has the defect, a phase of the manufacturing process at which the defect occurs.

The processor 110 uses the defect keyword list and selects one or more keywords from the lists as shown at block 554. The processor 110 compares the selected keywords with historical defect data, such as the defect list 360, as shown at block 552. For example, the processor 110 identifies a distance function to determine distances between the selected keyword and the keywords associated with the defects in the defect list 360, as shown at block 557. The processor may use the distances to identify defects that form a cluster, as shown at block 560. For example, the defects that have keywords within a predetermined distance from each other are within a cluster. In an example, the processor 110 uses separate keywords to identify distinct clusters and validate a cluster based on a specific keyword. The processor 110 retrieves the defects from the defect list 360 that are identified in a cluster with the current defect, as shown at block 562. The processor calculates a similarity index of the current defect compared to the defects in the cluster, as shown at block 518. The processor 110, in an example, uses the most similar defect in the cluster to identify a root cause and a solution to the defect based on the identified root cause, as shown at blocks 315 and 320. The processor 110 may continue the defect transformation 510 until the processor identifies a root cause for the current defect, as shown at block 520.

In another example, the processor calculates the similarity index as an average of the defect scores of the defects in the cluster. In another example, the similarity index may be calculated as a weighted average of the defect scores of the defects in the cluster with the distance of the defects from the current defect used as weight factors. Other techniques may be used to determine the similarity index from the defects in the cluster in other examples. The processor 110 then uses the similarity index to identify the root cause and the subsequent solution to the defect based on the root cause as shown at blocks 320 and 330.

To identify solutions to the current defect, the processor 110 generates a defect score for the current defect. Based on the defect score, the processor 110, identifies the solutions in the root cause database 170 that are used for defects with that defect score. The defect score is calculated using the defect characteristics. In an example, the defect score is calculated using following computations.

$$\text{Defect Score} = \text{Severity} * \text{Clarity} * \text{Occurrence} \quad (1)$$

$$\text{Severity} = (\text{Defect type} * \text{Stage} * \text{Time-to-Fail} * \text{Storage Size})/625 \quad (2)$$

$$\text{Clarity} = (\text{Reference Code} * \text{Root Cause} * \text{Defect Type})/8 \quad (3)$$

Further, the defect characteristics are quantified, such as in the example tables, Table 1-Table 3. Of course, different quantities may be used in different examples. Further, the input parameter values are adjusted continuously based on a feedback loop which considers the problem resolution findings. The processor 110, thus, quantifies the defect characteristics into the defect score, and then uses the defect score to identify one or more solutions to the defect.

TABLE 1

| Defect Type | Stage | Time-to-Fail | Storage Size |
|---|---|---|---|
| Functional (5) | FAB 1 (1) | Beginning (1) | 4 GB (1) |
| Mechanical-Incoming (2) | FAB 2 (3) | 25% of time (2) | 8 GB (2) |
| Mechanical-Induced (3) | Fulfillment (5) | 50% of Time (3) | 16 GB (3) |
| Mechanical-Unknown (1) | | 75% of Time (4) | 32 GB (4) |
| Unknown (4) | | End of Operation (5) | 64 GB (5) |

TABLE 2

| Reference Code | Root Cause | Defect Type |
|---|---|---|
| Known (1) | Known (1) | Known (1) |
| Unknown (2) | Unknown (2) | Unknown (2) |

TABLE 3

| Frequency | Occurrence Score |
|---|---|
| 1-10 | 1 |
| 11-20 | 2 |
| 21-30 | 3 |
| 31-40 | 4 |
| 41-50 | 5 |
| 51-60 | 6 |
| 61-70 | 7 |
| 71-80 | 8 |
| 81-90 | 9 |
| 91-100+ | 10 |

The processor 110 determines if a solution identified is acceptable, as shown at block 335. The processor 110 makes the determination based on a score assigned to a solution. If a solution retrieved from the root cause database 170 is acceptable, based on the score, the processor 110 continues to generate a resource skills matrix (RSM), as shown at blocks 335 and 345. Else, the processor 110 retrieves another solution to the root cause from the root cause database 170, as shown at block 340. The processor 110 identifies the solutions from the root cause database 170 using logistic regression. For example, the processor 110 compares the score of a first retrieved solution with a predetermined threshold score. If the score of the first retrieved solution is below (or above) the predetermined threshold score, the processor 110 retrieves a second solution and determine a score for the second retrieved solution. The processor 110 continues to retrieve a next solution from the root cause database 170 until the processor 110 identifies a solution with a score above (or below) the predetermined score threshold, or all the solutions in the root cause database 170 have been scored and evaluated.

Figure 4B:
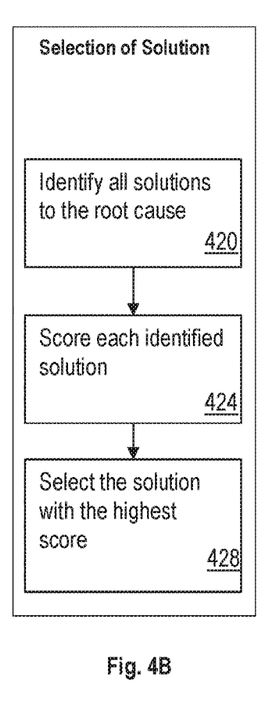
FIG. 4B illustrates a flowchart for solution selection in accordance with an embodiment.

FIG. 4B illustrates another flowchart of identifying a solution for the root cause. In this example, the processor 110 identifies all the solutions to the root cause from the root cause database 170 and scores each identified solution, as shown at blocks 420 and 424. The processor 110 then selects the solution with the highest score from the set of identified solutions, as shown at block 428.

Figure 4C:
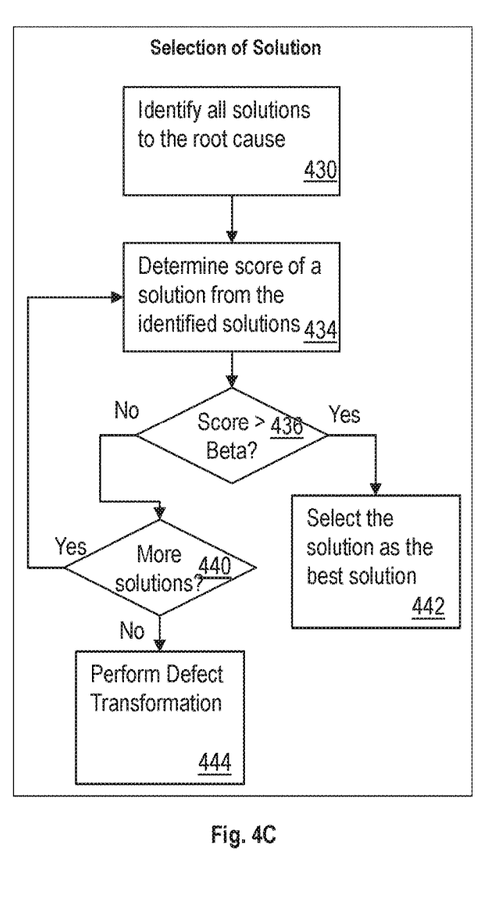
FIG. 4C illustrates a flowchart for solution selection in accordance with an embodiment.

In another example, the best solution has a score greater than a predefined value (beta). FIG. 4C illustrates a flowchart of such an example system. The system 100 identifies and retrieves all the potential solutions for the current defect, as shown at block 430. The system further computes the scores for each of the solutions and compares each score with the predefined threshold value (beta), as shown at blocks 434 and 436. If the score is greater than the predefined value, the corresponding solution is selected as the best solution, as shown at block 442. Else, the system continues to score and compare the rest of the identified solutions, as shown at block 440. If none of the identified solutions has a score greater than the predefined value, the system performs the defect transformation process described herein, to identify a similar defect and attempts to retrieve a solution with a score greater than the predefined value for the similar defect, as shown at block 444.

Figure 6:
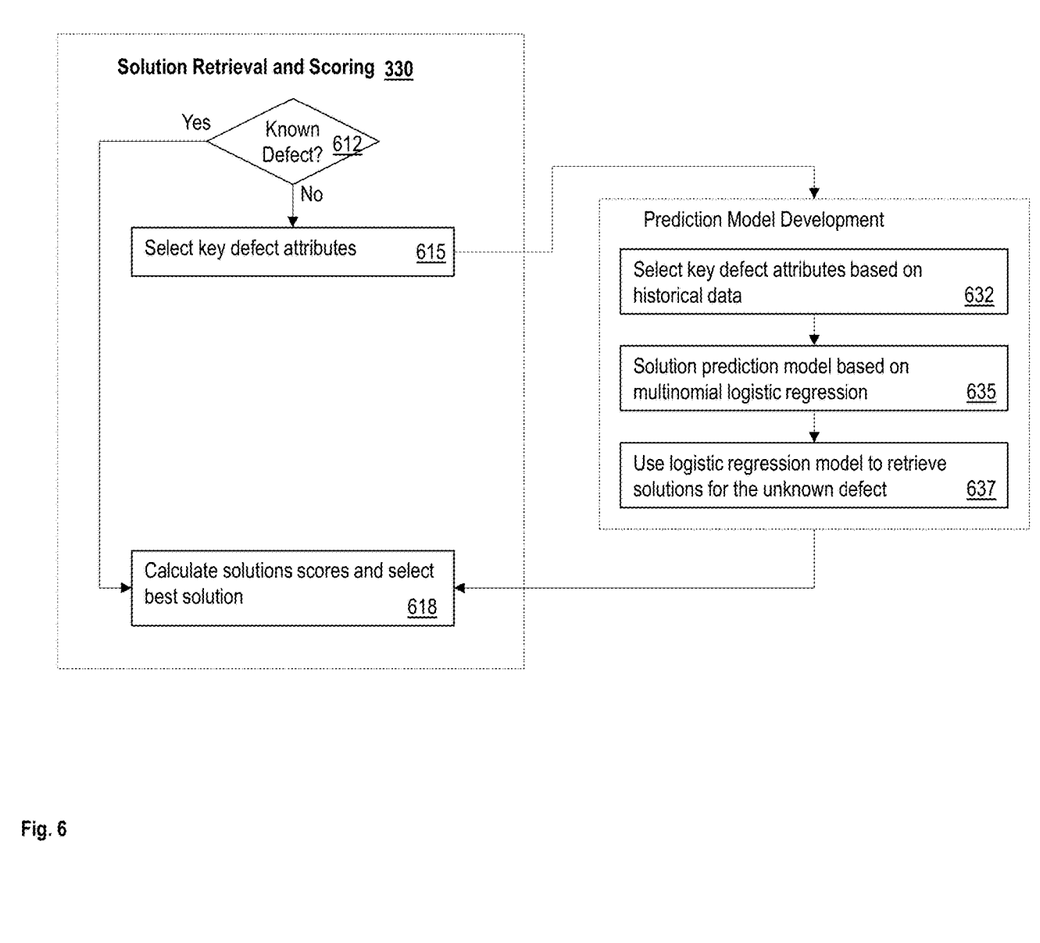
FIG. 6 illustrates a flowchart for solution retrieval and scoring in accordance with an embodiment.

FIG. 6 illustrates another flowchart of Solution Retrieval and Scoring. The processor 110 determines if the current defect is a known defect, such as from the defect list 360, or if defect transformation is being used to identify the root cause and the solution for the current defect, as shown at block 612. If the current defect is a known defect, the root cause database 170 matches the defect reference code and the root cause with the solutions. Accordingly, the processor 110 retrieves the solutions for the known defect from the root cause 170 and assigns a score to the retrieved solutions, as shown at block 618. In an example, the processor 110 determines the scores of the retrieved solutions based on a calculation such as:

$$\text{Solution Score} = \text{Cost} * \text{Effectiveness} * \text{Skills} * \text{Impact} \quad (4)$$

In an example, cost factor is quantified as very low (0.8-1.0), low (0.6-0.8), medium (0.4-0.6), high (0.2-0.4), and very high (0.0-0.2). The effectiveness factor measures how the solution will solve the defect and prevent the occurrence of any future similar defects. Effectiveness is scored as: very high (0.8-1.0), high (0.6-0.8), medium (0.4-0.6), low (0.2-0.4), and very low (0.0-0.2). Skills factor is scored as very low skills needed (0.8-1.0), low skills needed (0.6-0.8), medium skills needed (0.4-0.6), high skills needed (0.2-0.4), and very high skills needed (0.0-0.2). Impact factor represents the impact of implementing the solution on the current and/or other processes. Impact scores are the same as skills factor scores. Thus, in this example, the maximum score is 1 and the minimum score is 0, and the higher the score the better the solution is. Of course, different quantification and calculations may be performed in other examples.

If the current defect is not a known defect, that is if the current defect is a new defect, the processor 110 identifies the solution for the defect identified using the similarity index. For example, the processor 110 identifies the keywords associated with the current defect, as shown at block 615. The processor 110 selects one or more of the keywords. The processor selects the keywords based on the keywords that are stored in the root cause database 170 to identify a solution, as shown at block 632. For example, if the root cause database 170 stores the solutions classified according to defect type, production phase, and vendor names, the processor 110 selects those keywords for the current defect. The processor 110 generates a prediction model based on logistic regression based on the selected keywords, as shown at block 635. The processor 110 uses the logistic regression model to retrieve solutions for the unknown defect, as shown at block 637.

The processor may generate a multinomial logistic regression model to measure the relationship between the categorical defect characteristics and one or more known defects, such as those in the defect list in the root cause database 170. The processor may identify the relationships by estimating probabilities using a logistic function, such as a cumulative logistic distribution. Alternatively, or in addition, in other examples, the processor 110 uses linear discriminant analysis (LDA) to identify the solution to the unknown defect. Once the processor retrieves the solutions for the unknown defect, the processor scores the solutions, as shown at block 618.

The processor 110 further selects the highest scored solution from the retrieved solutions for the current defect in this manner. Referring back to FIG. 3, the processor 110 subsequently generates a resource-skills matrix (RSM) to determine the resource team to implement the solution identified, as shown at block 345. For example, for the current defect and consequently for the solution, the RSM determines the skills and resources to resolve the defect. Thus, the processor 110 generates the RSM for resolving the current defect by identifying the potential root causes and solutions, and further using the predetermined skills for the selected solution. The predetermined skills for the solution may be based on historical problem solving documentation. For example, in the manufacturing process example, skills refer to tools such as root cause analysis, failure mode effects and analysis, Pareto analysis, fault tree analysis, and other lean-six sigma techniques. Of course, different examples will use different predetermined skills for the solutions.

Figure 7:
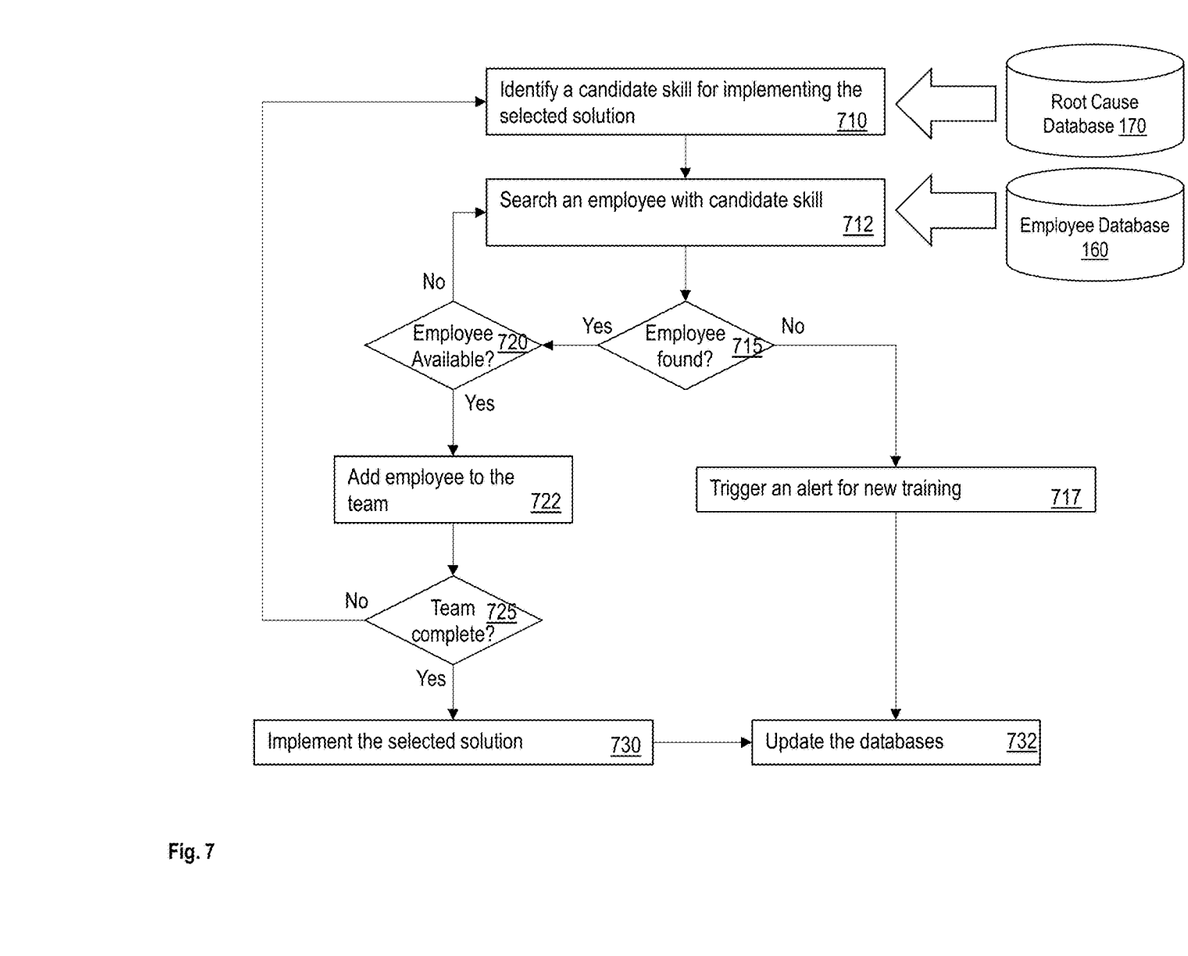
FIG. 7 illustrates a flowchart for selection of a team for resolving a defect in accordance with an embodiment.

Once the skills are identified, the processor 110 selects the team to resolve the defect. FIG. 7 illustrates a flowchart of selection of the team to resolve the current defect. In an example, the processor 110 identifies candidate employees suited to implement the solution based on the skills possessed by the candidate employees. The processor 110 identifies the skills of the candidate employees based on the data in the employee database 160, as shown at block 710. Alternatively or in addition, the processor 110 selects the team based on the solution score and solution type. For example, consider that a solution selected in a case is to return material to vendor. The processor 110 identifies that the resource for this case is a candidate employee with supplier relationship management skills. The processor 110 searches for candidate employees with that skill in the employee database 160, as shown at block 712. Upon identifying candidate employees with the skills, the processor 110 may further determine availability of the employee, as shown at blocks 715 and 720. For example, the processor determines a number of projects that the identified employee is already part of to determine availability of the employee. In another example, the processor 110 identifies a deadline to resolve the current defect and whether the identified employee is available to resolve the defect by the deadline, for example, based on the employee's calendar. For example, the identified employee may have scheduled a vacation, the identified employee may be working on a different shift, or the identified employee may have a prior commitment listed on the calendar. If the identified employee is available, the processor 110 adds the employee to the team, else continues to search for another employee with the predetermined skill, as shown at blocks 720, 722, and 712. In an example, the processor identifies a set of candidate employees, and selects a candidate employee who is assigned the least number of defect resolution projects, or the least number of total projects, to be part of the team. The processor 110 selects the employee as part of the team to resolve the current defect, as shown at block 722.

The processor 110 determines if more candidate employees are to be identified based on the predetermined skills for the solution, as shown at block 725. Consider another example, in which the selected solution is to scrap a part. Based on the candidate skills in the root cause database 170, the processor 110 identifies that a test engineer and a warehouse operator are to be part of the team to resolve the current defect. Accordingly, after selecting the test engineer, if the team is not complete, and more candidate employees are to be searched, the processor 110 repeats the above process to identify a warehouse operator for the team. Once the team is complete, the team implements the selected solution, as shown at block 730. The processor 110 updates the root cause database 170 with the solution and the skills used, as shown at block 732, and at block 350 of FIG. 3. In an example, the skills used may be different than those in the predetermined list of skills associated with the solution. For example, along with the predetermined skills listed in the root cause database 170, implementing the solution may use additional skills that team may identify to the system 100 after the solution has been implemented. The processor 110 updates the list of skills for the solution accordingly.

Further, in an example, the processor 110 may not identify a candidate employee with the predetermined skill for the solution, as shown at block 715. In such a case an employee is not assigned to the team, which further implies that no one has the skill to address the solution. The processor 110, in such a case triggers an alert to initiate training and skill development for the missing skill(s), as shown at block 717. This feedback is communicated to the employee database to provide the training for employees.

Figure 8:
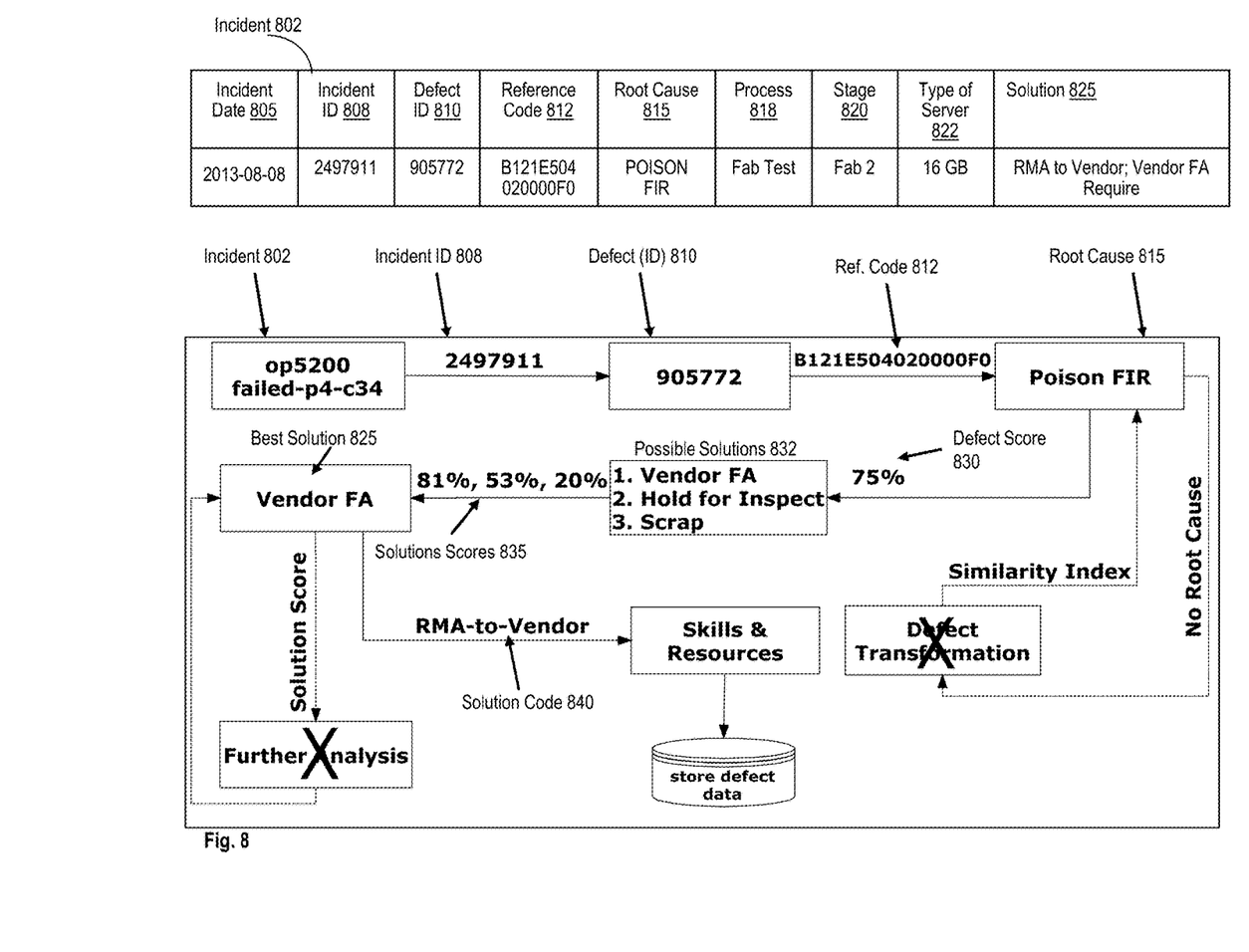
FIG. 8 illustrates an example workflow of a defect resolution system in accordance with an embodiment.

FIG. 8 illustrates an example incident 802 that is processed by the system 100. The incident 802 is a defect during the manufacturing. In an example, the system 100 records the time, such as a date 805, and assigns an incident identifier 808 to the incident 802. The system 100 further assigns the defect that occurred during the incident 802, a defect identifier 810. Based on characteristics of the defect, the system determines a reference code 812 for the defect. The system 100 further identifies the root cause 815 corresponding to the defect, such as based on the process 818, stage in the process 820, and the type of the server that was being manufactured 822. Here, the type of the server is identified as memory capacity of the server. Other examples, may categorize the type of the product being manufactured based on other attributes. In this example, a root cause 815 is identified. Accordingly, the system 100 does not perform a defect transformation in this case, as marked by the 'X' in FIG. 8. The system 100 determines a defect score 830 and uses the score to identify potential solutions 832 from the root cause database 170. Further, the system determines solution scores 835 for each respective potential solution from the potential solutions 832. The system 100 selects the best solution 825 according to the scores. For example, the system 100 selects the potential solution with the lowest (or highest) score as the best solution 825. In this case, the solution 100 identifies the solutions based on the defect score and hence no further analysis is performed, as noted by the 'X' in FIG. 8. The system 100 additionally identifies the skills and resources to implement the best solution by accessing the root cause database 170 using a solution reference code 840 associated with the best solution 825. The system 100 further updates the root cause database 170 according to feedback regarding implementation of the best solution 825, such as the skills and resources used during the implementation of the best solution 825.

Thus, the technical solutions described herein facilitate defect identification and resolution during product development, such as in a complex manufacturing environment, a software development process, a product packaging line, a product assembly line, a clean room, or any other process. The technical solutions quantitatively score defects and solutions to improve the process by mapping defects to reference codes that represent roots causes identified during previous occurrences of the defects. For example, a development team, senior technicians, and other employees of an organization may identify the root cause. The technical solutions facilitate an automated system to perform the mapping process, score the defects, identify the best solution, and determine the resources and skills to resolve the defect. The system 100, in an example, identifies more than one solution for a defect. The technical solutions facilitate the system to automatically score the solutions and to select the best solution based a scores of the solutions. A solution score is based on cost, effectiveness, required skills, and impact of the solution on the process. The system 100 further generates a resource-skills matrix to resolve the defect considering both risk identification and solution implementation. For each defect, the matrix identifies the skills and resources for resolving the defect. Based on the resource-skills matrix and an employee database, the system may further identify and assign one or more employees to resolve the defect. Alternatively or in addition, the system identifies a gap in employee skills or resources and triggers an initiation of training for the missing skills or resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for resolving a defect during a manufacturing process, the method comprising:
   generating, by a processor, a defect reference code in response to occurrence of the defect during the manufacturing process;
   determining presence of the reference code in a root cause database;
   identifying a root cause of the defect in response to the reference code being present in the root cause database, wherein an entry in the root cause database matches the defect and the root cause based on the reference code;
   generating a defect score for the defect based on characteristics of the defect and characteristics of the root cause the defect score computed as Defect Score=Severity*Clarity*Occurrence, wherein the Severity, Clarity, and Occurrence are automatically determined based on the characteristics of the defect that are obtained from the root cause database;
   identifying, from the root cause database, a set of solutions for the defect based on the defect score;

generating a solution score for each solution in the set of solutions;

selecting a first solution from the set of solutions to implement in response to the defect, the first solution selected in response to the first solution being the solution with the highest score among the set of solutions;

determining a candidate skill for implementing the first solution;

identifying, from an employee database, a candidate employee that has the candidate skill to implement the first solution, wherein the employee database comprises an employee record for each candidate employee, and the employee record identifies candidate skills possessed by the corresponding candidate employee;

assigning the candidate employee to the team to resolve the defect according to the first solution; and completing the manufacturing process using the candidate employee to resolve the defect, wherein the defect score is based on a stage of the manufacturing process, wherein the Severity is computed as Severity=(Defect type*Stage*Time-to-Fail*Storage Size)/K, K being a predetermined value.

2. A computer implemented method for resolving a defect during a manufacturing process, the method comprising:

generating, by a processor, a defect reference code in response to occurrence of the defect during the manufacturing process;

determining presence of the reference code in a root cause database;

identifying a root cause of the defect in response to the reference code being present in the root cause database, wherein an entry in the root cause database matches the defect and the root cause based on the reference code;

generating a defect score for the defect based on characteristics of the defect and characteristics of the root cause, the defect score computed as Defect Score=Severity*Clarity*Occurrence, wherein the Severity, Clarity, and Occurrence are automatically determined based on the characteristics of the defect that are obtained from the root cause database;

identifying, from the root cause database, a set of solutions for the defect based on the defect score;

generating a solution score for each solution in the set of solutions;

selecting a first solution from the set of solutions to implement in response to the defect, the first solution selected in response to the first solution being the solution with the highest score among the set of solutions;

determining a candidate skill for implementing the first solution;

identifying, from an employee database, a candidate employee that has the candidate skill to implement the first solution, wherein the employee database comprises an employee record for each candidate employee, and the employee record identifies candidate skills possessed by the corresponding candidate employee;

assigning the candidate employee to the team to resolve the defect according to the first solution; and completing the manufacturing process using the candidate employee to resolve the defect, wherein the defect score is based on a defect type, and a root cause of the defect, wherein the Clarity is computed as Clarity=(Reference Code*Root Cause*Defect Type)/J, J being a predetermined value.

* * * * *